(12) United States Patent
Garner et al.

(10) Patent No.: US 12,536,217 B2
(45) Date of Patent: Jan. 27, 2026

(54) MULTIMEDIA DATA SEARCH USING MULTI-MODAL FEATURE EMBEDDINGS

(71) Applicant: Roku, Inc., San Jose, CA (US)

(72) Inventors: Gregory Garner, Key Colony Beach, FL (US); Sunil Ramesh, Saratoga, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 18/401,144

(22) Filed: Dec. 29, 2023

(65) Prior Publication Data

US 2025/0217405 A1  Jul. 3, 2025

(51) Int. Cl.
*G06F 16/00* (2019.01)
*G06F 16/432* (2019.01)
*G06F 16/435* (2019.01)
*G06F 16/438* (2019.01)

(52) U.S. Cl.
CPC .......... *G06F 16/432* (2019.01); *G06F 16/435* (2019.01); *G06F 16/438* (2019.01)

(58) Field of Classification Search
CPC ............................... G06F 16/00; G06F 16/432
See application file for complete search history.

(56) References Cited

U.S. PATENT DOCUMENTS

| | | | |
|---|---|---|---|
| 11,782,979 B2* | 10/2023 | Lyu | G06V 20/46 707/769 |
| 2010/0082627 A1* | 4/2010 | Lai | G06F 16/9535 707/738 |
| 2022/0391432 A1* | 12/2022 | Nazari | G06F 16/483 |
| 2024/0135748 A1* | 4/2024 | Balavalikar Krishnamurthy | G06V 40/172 |

* cited by examiner

*Primary Examiner* — Cheryl Lewis
(74) *Attorney, Agent, or Firm* — Straylight LLP

(57) ABSTRACT

Aspects of the disclosed technology provide solutions for searching objects within multimedia content based on multi-modal embeddings. An example method can include receiving media content including a plurality of video frames. The method can include steps for generating, using a pre-output layer of a machine learning algorithm, one or more multi-modal feature embeddings describing at least one object for the plurality of video frames, receiving a query including a request to search the media content for a matching object, determining whether the media content includes the matching object based on the one or more multimodal feature embeddings describing the at least one object, and returning one or more results in response to determining that the media content includes the matching object. Systems and machine-readable media are also provided.

20 Claims, 10 Drawing Sheets

MULTIMEDIA DATA SEARCH USING MULTI-MODAL FEATURE EMBEDDINGS

FIELD

This disclosure is generally directed to searching multimedia data, and more particularly to searching objects within multimedia data based on multi-modal feature embeddings.

SUMMARY

Provided herein are system, apparatus, article of manufacture, method and/or computer program product embodiments, and/or combinations and sub-combinations thereof, for searching multimedia content (e.g., multimedia data, video frames) for objects using multimodal feature embeddings.

In some aspects, a method is provided for searching objects within multimedia content based on multimodal feature embeddings. The method can include receiving media content. The media content can include a plurality of video frames. Using a pre-output layer of a machine learning algorithm, one or more multimodal feature embeddings describing at least one object for the plurality of video frames can be generated. The method can also include receiving a query including a request to search the media content for a matching object. Based on the one or more multimodal feature embeddings describing the at least one object, it can be determined whether the media content includes the matching object. In response to determining that the media content includes the matching object, one or more results can be returned.

In some aspects, a system is provided for searching objects within multimedia content based on multi-modal feature embeddings. The system can include one or more memories and at least one processor coupled to at least one of the one or more memories and configured to receive media content. The media content can include a plurality of video frames. Using a pre-output layer of a machine learning algorithm, one or more multimodal feature embeddings describing at least one object for the plurality of video frames can be generated. The at least one processor of the system can be configured to receive a query including a request to search the media content for a matching object. The at least one processor of the system can also be configured to determine whether the media content includes the matching object based on the one or more multimodal feature embeddings describing the at least one object. In response to determining that the media content includes the matching object, one or more results can be returned.

In some aspects, a non-transitory computer-readable medium is provided for searching objects within multimedia content based on multi-modal feature embeddings. The non-transitory computer-readable medium can have instructions stored thereon that, when executed by at least one computing device, cause the at least one computing device to receive media content. The media content can include a plurality of video frames. Using a pre-output layer of a machine learning algorithm, one or more multimodal feature embeddings describing at least one object for the plurality of video frames can be generated. The instructions of the non-transitory computer-readable medium can, when executed by the at least one computing device, cause the at least one computing device to receive a query including a request to search the media content for a matching object. The instructions of the non-transitory computer-readable medium also can, when executed by the at least one computing device, cause the at least one computing device to determine whether the media content includes the matching object based on the one or more multimodal feature embeddings describing the at least one object. In response to determining that the media content includes the matching object, one or more results can be returned.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
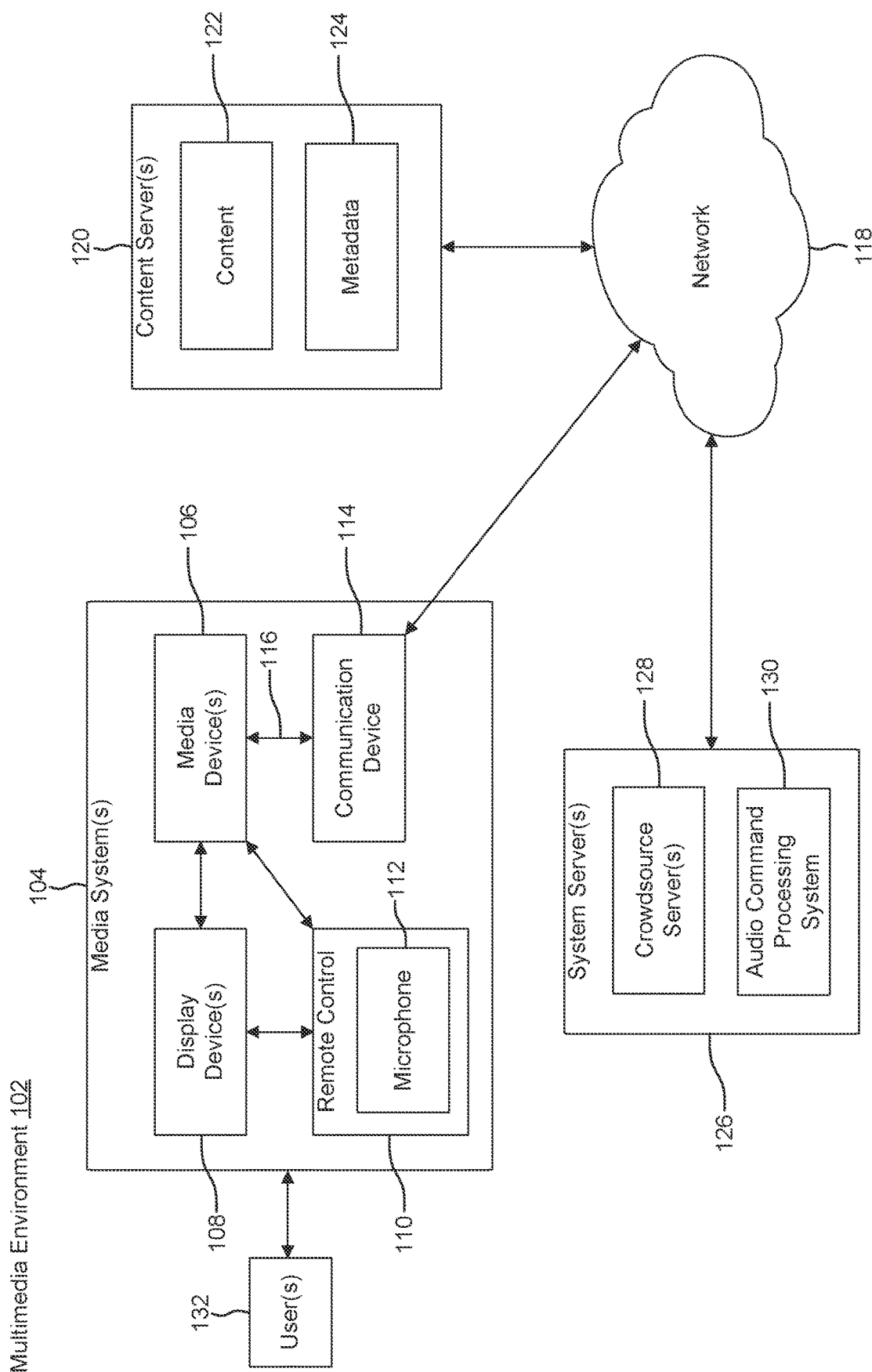
FIG. 1 illustrates a block diagram of an example multimedia environment, according to some examples of the present disclosure.

Home security systems consist of strategically placed cameras both inside and outside the house. These cameras have video recording capabilities to monitor and record activities in and around a residence. Users can access and review the recorded footage (e.g., video frames) through a user interface provided by the security system to view specific timeframes or to identify certain objects or events. For example, semantic labels can be associated with specific objects, scenes, or activities within each frame, allowing users to query and retrieve relevant video segments. However, processing an extensive amount of recordings to assign semantic labels for searching and detection can present several challenges. Specifically, semantic labeling demands significant computational resources and time. Also, acquiring and annotating datasets for training can be time-consuming and expensive.

Aspects of the disclosed technology provide solutions for searching multimedia data (e.g., video frames) using a variety of input modalities, including but not limited to images, sound, speech, multimedia files, text strings, etc. In some aspects, object(s) within the multimedia data can be tagged with multimodal feature embeddings (also referred to as feature embeddings or embeddings) representing latent characteristics of the corresponding object. The multimodal feature embeddings can be used to characterize object characteristics for multiple sensor modalities or data types. For example, multimodal feature embeddings can embed object descriptors/characteristics for image data, sound data, speech data, motion data, textual data (e.g., words), weather data, historical data from other sources, etc.

As used herein, embedding (e.g., embedding vector) can refer to a vector description of latent object characteristics. By training a machine-learning model to generate embeddings of similar dimensionality, the object(s) can be searched by identifying those objects that are closest in Euclidean space to the embedding generated from the search query. That is, an object can be searched based on multimodal feature embeddings in a pre-output layer (e.g., a penultimate layer) of a machine learning algorithm without needing the semantic labels in an output layer.

Further, in some aspects, the system can generate a user-based privacy filter based on information provided by a user in a query. As follows, the user-based privacy filter can filter one or more embeddings such that unauthorized or unwanted information within multimedia data (e.g., video frames) can be hidden. In some cases, the system can generate a user-based privacy filter to filter one or more search results (e.g., identified objects) within multimedia data. The user-based privacy filter to filter one or more embeddings or search results can provide users with customized recognition/identification and privacy preservation.

As discussed in further detail below, the technologies and techniques described herein can significantly reduce the time and effort needed for mining multimedia data by providing solutions for searching objects within multimedia content using a pre-output layer of a machine learning algorithm and without having to rely on semantic labels in an output layer.

Various embodiments and aspects of this disclosure may be implemented using and/or may be part of a multimedia environment 102 shown in FIG. 1. It is noted, however, that multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

In some aspects, the multimedia environment 102 may be directed to multimedia surveillance and/or security systems. For example, multimedia environment 102 may include media system 104, which could represent a house, a building, an office, or any other location or space where it is desired to implement a surveillance and security system with one or more sensors (e.g., a camera, a microphone, etc.) to monitor the surrounding environment. User(s) 132 may operate with the media system 104 to consume the multimedia data (e.g., content) captured/collected by the sensors of the surveillance and security system.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some examples, media device 106 can be a part of, integrated with, operatively coupled to, and/or connected to its respective display device 108.

In some examples, media device 106 may include one or more sensors implemented within a surveillance and security system such as a camera (or a security camera), a smart camera, a doorbell camera, an IoT camera, and/or any other type of image sensor that can be used to monitor and record the surroundings. The recording or live feed that is captured by such sensors can be sent to display device 108 such as a smartphone, computer, tablet, IoT device, etc.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some examples, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, recording or live feed from a surveillance and security system, and/or any other content or data objects in electronic form.

In some examples, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing system 130. As noted above, the remote control 110 may include a microphone 112. The microphone 112 may receive audio data from users 132 (as well as other sources, such as the display device 108). In some examples, the media device 106 may be audio responsive, and the audio data may represent verbal commands from the user 132 to control the media device 106 as well as other components in the media system 104, such as the display device 108.

In some examples, the audio data received by the microphone 112 in the remote control 110 is transferred to the media device 106, which is then forwarded to the audio command processing system 130 in the system servers 126. The audio command processing system 130 may operate to process and analyze the received audio data to recognize the user 132's verbal command. The audio command processing system 130 may then forward the verbal command back to the media device 106 for processing.

Figure 2:
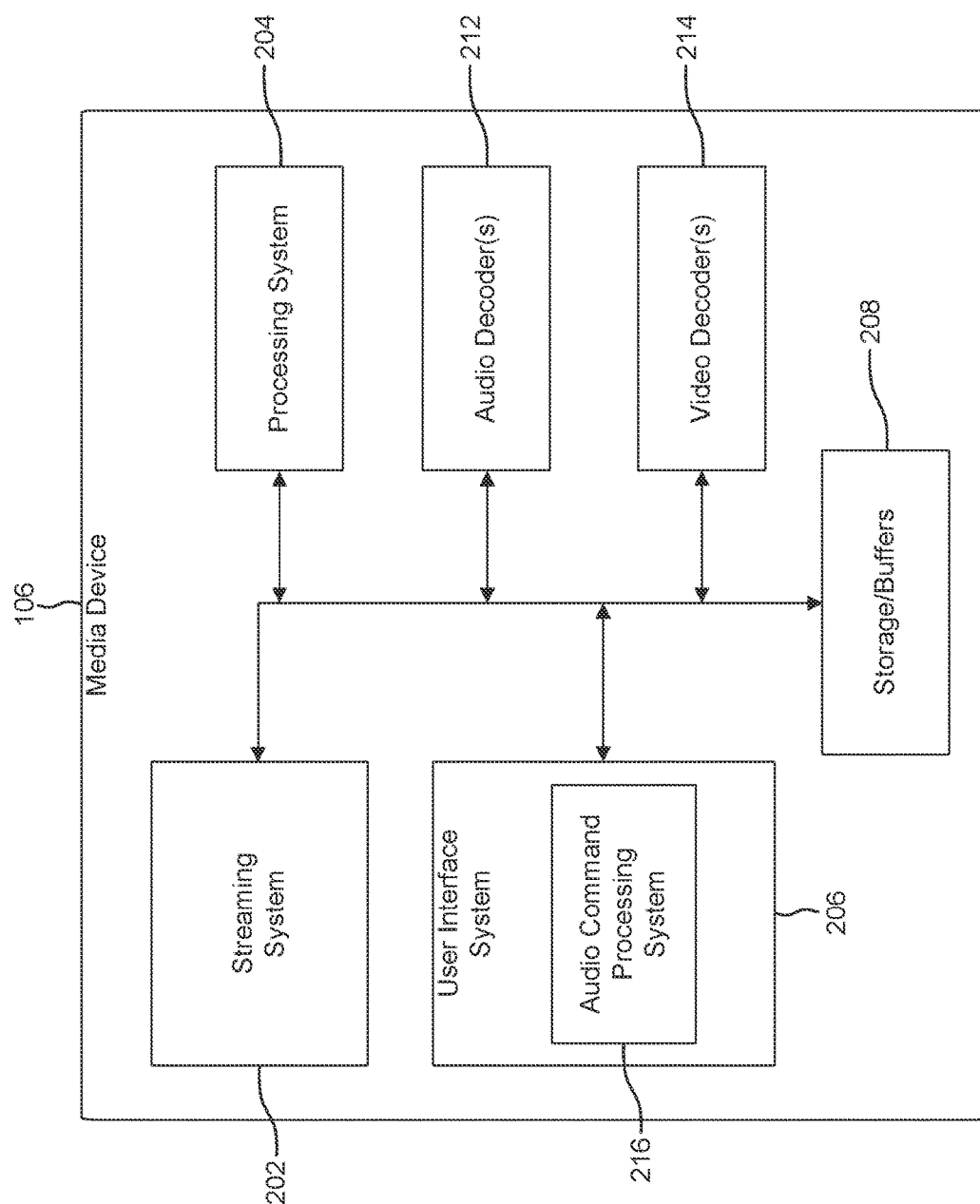
FIG. 2 illustrates a block diagram of an example streaming media device, according to some examples of the present disclosure.

In some examples, the audio data may be alternatively or additionally processed and analyzed by an audio command processing system 216 in the media device 106 (see FIG. 2). The media device 106 and the system servers 126 may then cooperate to pick one of the verbal commands to process (either the verbal command recognized by the audio command processing system 130 in the system servers 126, or the verbal command recognized by the audio command processing system 216 in the media device 106).

FIG. 2 illustrates a block diagram of an example media device 106, according to some embodiments. Media device 106 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, VVC, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, VVC, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

The media device 106 may also include one or more sensors such as image sensors, accelerometers, gyroscopes, inertial measurement units (IMUs), light sensors, positioning sensors (e.g., GNSS), any other type of sensor, and/or any combination thereof. In one illustrative example, sensors of media device 106 may correspond to an image sensor that can be configured to capture image data and/or video data as part of a security surveillance system. In some examples, media device 106 may also include one or more light sources (not illustrated). For instance, media device 106 can include an infrared (IR) light source, visible light source, laser source, or the like.

Now referring to both FIGS. 1 and 2, in some examples, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming system 202 of the media device 106 may request the selected content from the content server(s) 120 over the network 118. The content server(s) 120 may transmit the requested content to the streaming system 202. The media device 106 may transmit the received content to the display device 108 for playback to the user 132.

In streaming examples, the streaming system 202 may transmit the content to the display device 108 in real time or near real time as it receives such content from the content server(s) 120. In non-streaming examples, the media device 106 may store the content received from content server(s) 120 in storage/buffers 208 for later playback on display device 108.

Multimedia Data Search Based on Multimodal Feature Embeddings

Referring to FIG. 1, content server(s) 120 and/or the media system 104 can be configured to perform applicable functions related to search media content (e.g., content 122) for an object that is requested or indicated in a user query. The content server(s) 120 or the media device(s) 106 can use an algorithm, such as a machine learning algorithm, to generate one or more multimodal feature embeddings that are descriptive of object(s) in the media content (e.g., content 122). For example, the content server 120 or the media device 106 can generate, using a pre-output layer of a machine learning algorithm (e.g., a penultimate layer), the one or more multimodal feature embeddings based on one or more signals in one or more frames of the media content, such as a visual signal (e.g., image data), an audio signal (e.g., audio data), motion data, text data, and/or any other signal. As previously described, multimodal feature embeddings can embed object descriptors/characteristics for image data, sound data, speech data, motion data, textual data (e.g., words), weather data, historical data from other sources, etc. In some examples, a pre-output layer of a machine learning algorithm can include a layer prior to an output layer (e.g., output layer 921 as illustrated with respect to FIG. 9) such as hidden layers 922a, 922b, through 922n or a penultimate layer.

In some examples, content server(s) 120 and/or media devices 106 can receive a query, which includes a request to search the media content (e.g., content 122) for a matching object. For example, the content server(s) 120 and/or the media system 104 can receive a query from user(s) 132. In some cases, the query may include a request to search the media content for a motion (or a gesture) associated with the matching object. In some aspects, the query may include a request to search the media content for a sound or speech associated with the matching object.

In some cases, content server(s) 120 or the media device(s) 106 can determine, based on the multimodal feature embeddings, whether the media content includes the matching object that is requested/indicated in the query from user(s) 132. For example, a specific object or event can be searched by identifying the object or event that is closest in Euclidean space to the embedding generated from the search query.

The content server(s) 120 or the media device(s) 106 can return one or more search results in response to determining that the media content includes the matching object. Further, the content server(s) 120 or the media device(s) 106 may transmit a notification to a remote device (e.g., Internet of Things (IoT) devices such as thermostats, lights, door locks, security cameras, and other home automation devices, etc.).

Figure 3:
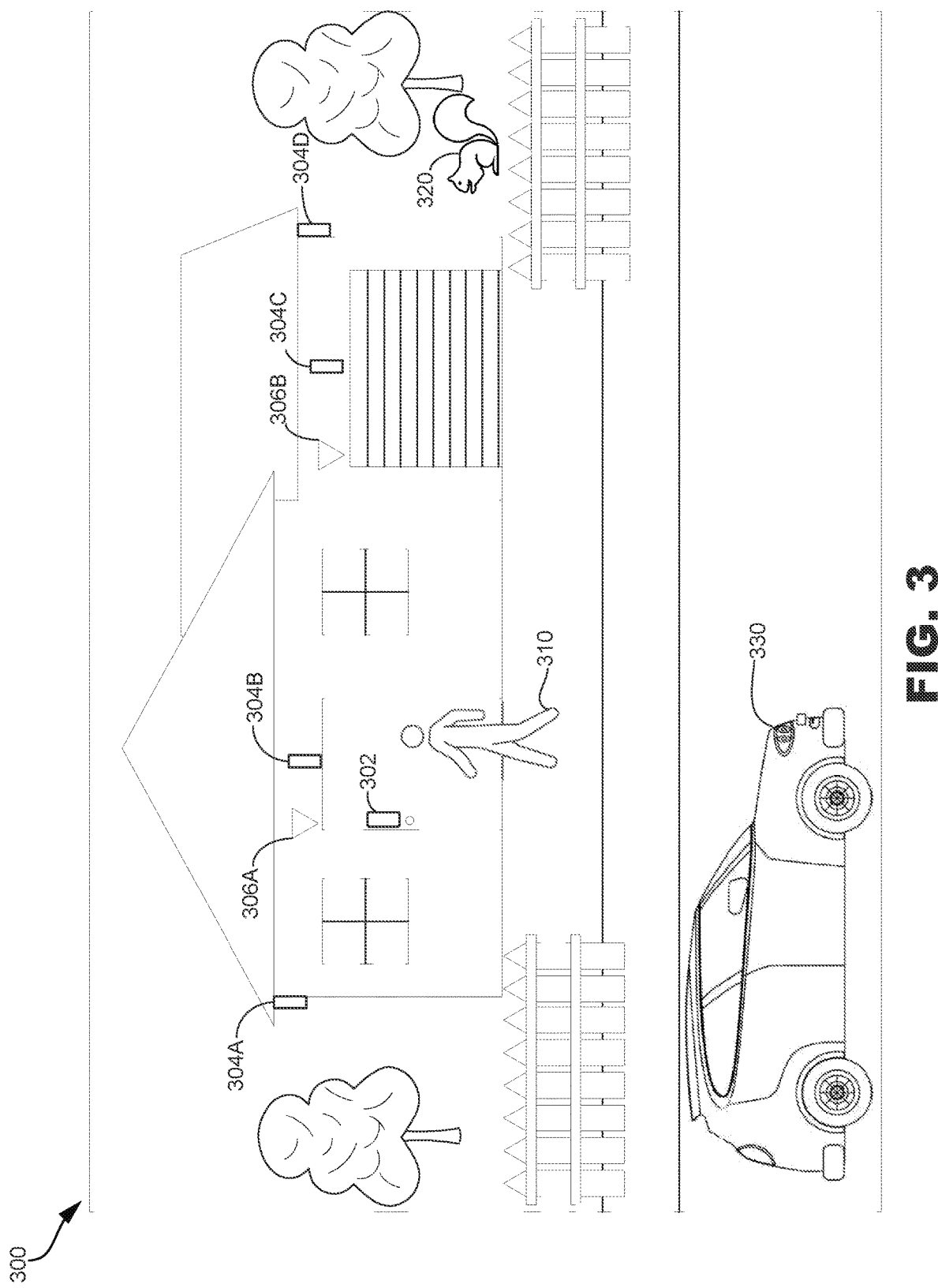
FIG. 3 illustrates an example environment containing objects for which media content searching and recognition may be performed, according to some examples of the present disclosure.

The disclosure now continues with a further discussion of searching objects within multimedia content based on multimodal feature embeddings. Specifically, FIG. 3 is an example environment 300 containing objects for which multimedia data searching and recognition may be performed. According to some examples, example environment 300 can be implemented with multimedia environment 102 of FIG. 1. For example, multimedia environment 102 of FIG. 1 can be part of example environment 300 or vice versa.

The example environment 300 includes a house that is equipped with a home security system. The home security system may comprise various components (e.g., IoT devices) such as a doorbell 302, security cameras 304A, 304B, 304C, 304D (collectively, security camera 304), lighting motion sensors 306A, 306B (collectively, lighting motion sensor 306), etc. While the example environment 300 illustrates the outdoor components, the home security system can comprise similar components placed/installed inside the house (e.g., a security camera, smoke detector, temperature sensor, etc.).

In some examples, security camera 304 (e.g., surveillance camera, outdoor camera, etc.) functions to monitor the surroundings and/or record video images. For example, security camera 304A facing the street can capture video images of vehicle 330 that is passing by the house. The security camera 304B installed at the front door can capture video images of person 310 who is approaching the front door. The security camera 304C installed above a garage door can capture video images of a driveway. The security camera 304D facing the yard can capture video images of squirrel 320 in the yard. Further, doorbell 302 may include a camera sensor, a microphone, and a speaker. That is, doorbell 302 may function to capture video images (e.g., image data and audio data) of the scene or any object that may be present within the field of view of the doorbell camera sensor.

In some aspects, the video images that are captured by doorbell 302 and/or security camera 304 may be stored, which can be retroactively retrieved and searched for a specific object, sound, motion, event, etc. For example, video images that are stored can be mined to search for occurrences where squirrel 320 appeared in the yard. As previously described, an object can be searched based on multimodal feature embeddings in a pre-output layer (e.g., a penultimate layer) of a machine learning algorithm without needing the semantic labels in an output layer. Specifically, multimedia data (e.g., video images) can be tagged with multimodal feature embeddings representing characteristics of a corresponding object within the multimedia data. For example, embeddings can be generated as vector descriptions of person 310, squirrel 320, or vehicle 330 that are captured in the video images.

In some examples, doorbell 302, security camera 304, lighting motion sensor 306, and other components of the home security system (e.g., IoT devices) in example environment 300 can communicate directly with each other without requiring intermediary servers. For example, IoT devices such as doorbell 302, security camera 304, lighting motion sensor 306, and other components of the home security system in example environment 300 can be connected to each other using a mesh network. The mesh network can be implemented using a wireless local area network (WLAN) such as WiFi, or any applicable wireless and/or wired networks. In some examples, a network for connecting the IoT devices in example environment 300 can include, without limitation, mesh, wired and/or wireless intranet, extranet, Internet, cellular, Bluetooth, infrared, and/or any other short range, long range, local, regional, global communications mechanism, means, approach, protocol and/or network, as well as any combination(s) thereof.

which enables real-time coordination between devices within a local network. For example, doorbell 302, security camera 304, and lighting motion sensor 306 can collect and share data (e.g., multimedia data, video frames, etc.), and therefore, the exchange of data between devices and automated control and management of devices can be achieved. For example, a detection of a certain person on security camera 304B can trigger activation of lighting motion sensor 306A or doorbell 302.

In some cases, in response to determining that an object or event of interest is captured in video images from doorbell 302 or security camera 304, a notification (e.g., an alert) can be transmitted to a remote device such as a user device. For example, upon determining that a squirrel appears in the yard within a certain distance from a garage, a notification can be sent to a user device to alert such an event. In some aspects, a user device can be any of a personal digital assistant (PDA), desktop workstation, laptop or notebook computer, netbook, tablet, smart phone, smart watch, or other wearable appliance, to name a few non-limiting examples, or any combination thereof. In some examples, a user can control and/or configure one or more components of the home security system (e.g., doorbell 302, security camera 304, lighting motion sensor 306, etc.) using a user device. For example, a user device can be used to schedule or manage the operation of the components (e.g., IoT devices) of the home security system or the communication between the components of the home security system.

Figure 4:
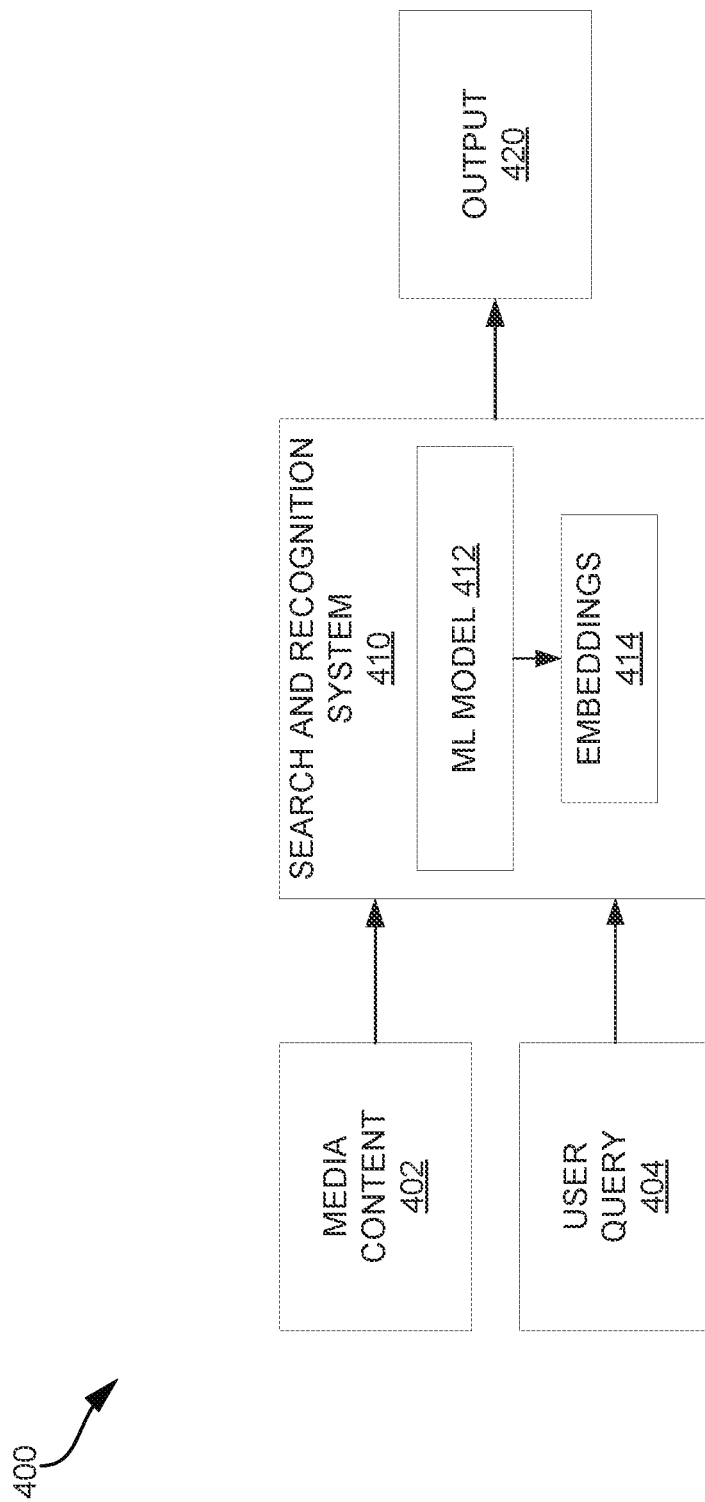
FIG. 4 illustrates an example system for searching objects within multimedia content based on multi-modal feature embeddings, according to some examples of the present disclosure.

FIG. 4 illustrates an example system 400 for searching objects within multimedia content based on multi-modal feature embeddings, according to some examples of the present disclosure. As illustrated, system 400 includes search and recognition system 410 for generating output 420 (e.g., search results) based on media content 402 and user query 404.

The various components of system 400 can be implemented at applicable places in the multimedia environment shown in FIG. 1. For example, media content 402 can reside at content servers 120 and/or media system 104. The search and recognition system 410 may reside at media system 104, system server 126, content server 120, or a combination thereof.

The search and recognition system 410 may function to receive or access media content 402 and search the media content 402 for object(s) as indicated or requested in user query 404. For example, search and recognition system 410 may receive user query 404, which includes a request to search media content 402 for a matching object.

The search and recognition system 410 can include an ML model 412 for generating embeddings 414 (e.g., vector representations). That is, search and recognition system 410 can, using ML model 412, encode features of the media content 402 as a vector into an embedding space. The embedding space can exist across different media modalities. For example, ML model 412 can encode features in different media modalities to create an embedding space across the different media modalities. As follows, search and recognition system 410 can use ML model 412 to generate, in the pre-output layer of the ML model 412 (e.g., a penultimate layer), one or more multimodal feature embeddings that are descriptive of an object within media content 402.

In encoding features in different modalities, ML model 412 can use respective signals within media content 402 to generate embeddings 414 that represent and/or describe one or more features in media content 402 that are associated with an object (e.g., across the different media modalities). For example, ML model 412 can use a visual signal (e.g., image data) to generate embeddings 414 representing and/or encoding information in media content 402 such as a depicted object, a depicted background, a depicted foreground, a depicted scene, a depicted action/activity, a depicted gesture, and/or any other visual features. Also, ML model 412 can use an audio signal (e.g., audio data) to generate embeddings 414 representing and/or encoding information such as dialogue/speech, a sound(s), a noise, a noise level, music, a type of sound, a voice, a tone of voice, and/or any other audio features. In some illustrations, ML model 412 can process any other types of signals in media content 402 to generate corresponding embeddings 414.

As previously described, search and recognition system 410 may search media content 402 for a matching object as indicated or required in user query based on embeddings 414. For example, user query 404 may include a request to search media content 402 for a matching object (e.g., person 310, squirrel 320, or vehicle 330 as illustrated in FIG. 3). Without referring to semantic labels to search for a matching object, search and recognition system 410 can determine whether media content 402 includes a matching object based on embeddings 414.

Since embeddings 414 include multimodal feature embeddings, search and recognition system 410 may search media content 402 for a specific object, event, sound, motion, etc. In some cases, a user query may include a request to search media content 402 for sound that may be associated with a matching object. For example, user query 404 can include a request to search media content 402 (e.g., video frames) for any occurrences where an audio signal from an ambulance siren was captured by one of security cameras 304A-D.

In some examples, a user query may include a request to search media content 402 for motion or gesture over a plurality of video frames that may be associated with a matching object. For example, user query 404 can include a request to search media content 402 (e.g., video frames) for any occurrences where squirrel 320 is climbing up a tree in the yard. In some aspects, a user query may include a request to search media content 402 for a specific event (e.g., raining, snowing, a thunderstorm, hail, earthquake, etc.).

In some aspects, search and recognition system 410 may be used to manage the operation of a home security system in a communication network. As previously described, the home security system may include multiple components (e.g., IoT devices) such as a camera, a lighting device, a security alarm, a doorbell, a motion detector, lights, thermostats, smart locks, etc. (e.g., doorbell 302, security camera 304, lighting motion sensor 306), which connect with the communication network to perform various operations.

Figure 5:
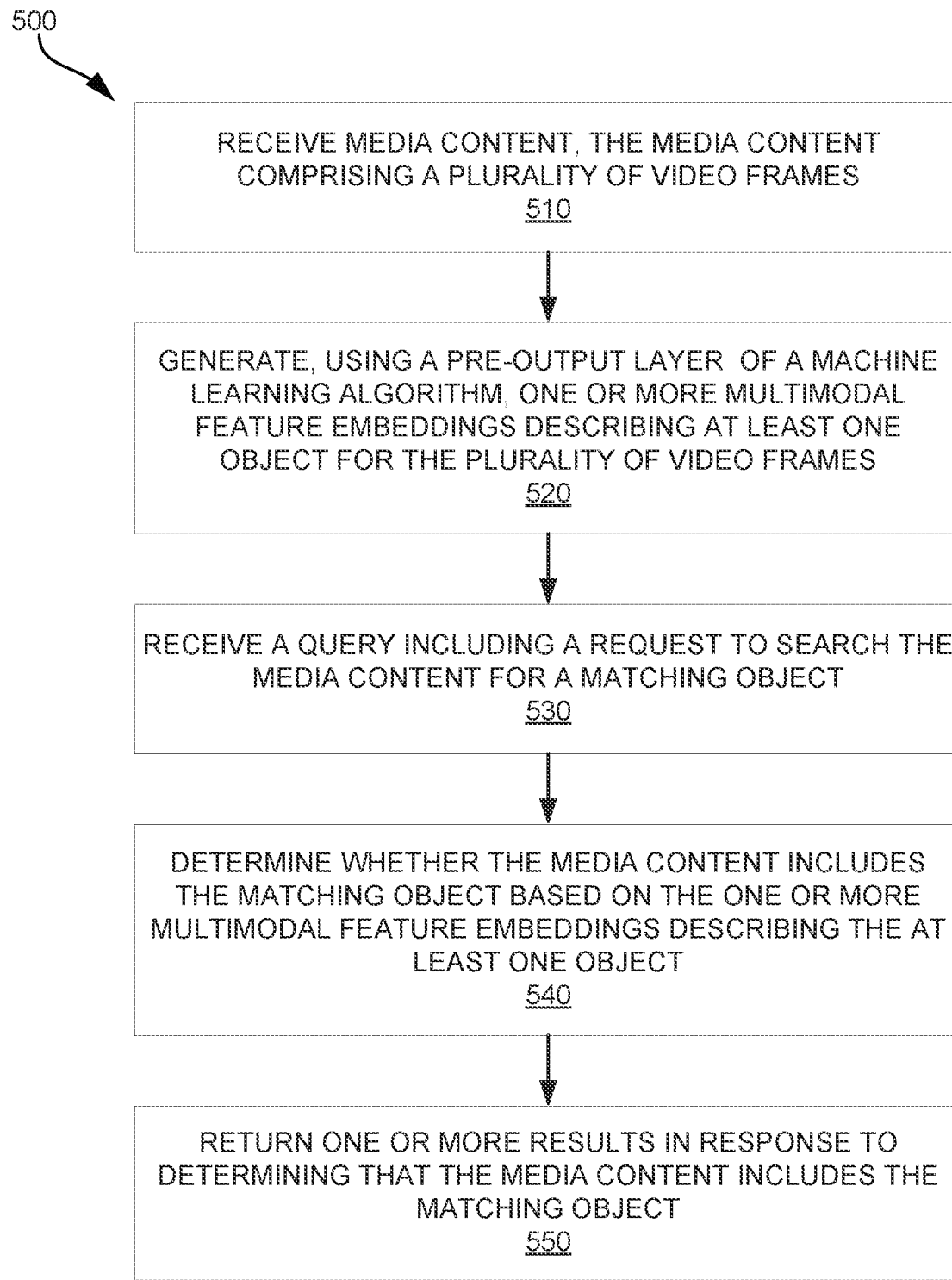
FIG. 5 illustrates a flowchart of an example method for searching objects within multimedia content based on multi-modal feature embeddings, according to some examples of the present disclosure.

FIG. 5 is a diagram illustrating a flowchart of an example method 500 for searching objects within multimedia content based on multi-modal feature embeddings, according to some examples of the present disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 4. However, method 500 is not limited to that example.

In step 510, method 500 includes receiving media content. For example, search and recognition system 410 can receive media content 402. The media content may include a plurality of frames such as a continuous sequence of video frames. For example, the media content can include video images or recordings captured by one or more sensors of a surveillance and security system (e.g., security camera 304 as illustrated in FIG. 3).

In some aspects, search and recognition system 410 may receive media content 402 from a content server (e.g., content server(s) 120) over a network (e.g., network 118). For example, media content 402 can include a collection of datasets captured by various IoT devices (e.g., doorbell 302, security camera 304, etc.) that are sent to a content server.

In step 520, method 500 includes generating, using a pre-output layer of a machine learning algorithm, one or more multimodal feature embeddings (e.g., vector representations) describing at least one object for the plurality of video frames. For example, search and recognition system 410 may generate, using a pre-output layer (e.g., a penultimate layer) of ML model 412, embeddings 414 describing at least one object for the plurality of video frames such as person 310, squirrel 320, vehicle 330 as illustrated in FIG. 3.

In some aspects, embeddings 414 include multimodal feature embeddings that are created in an embedding space across the different media modalities. That is, ML model 412 can use respective signals within media content 402 to generate embeddings 414 that represent and/or describe one or more features in media content 402 such as a visual signal (e.g., image data), an audio signal (e.g., audio data), words (e.g., text data), etc. within media content 402.

In step 530, method 500 includes receiving a query including a request to search the media content for a matching object. For example, search and recognition system 410 can receive user query 404 including a request to search media content 402 for a matching object.

In some aspects, a matching object as indicated in user query 404 is a simulated object. For example, user query 404 may include a request to search media content 402 for an object that has never been captured before. The search and recognition system 410 can generate a simulated object, based on a description of an object provided in user query 404, and generate feature embeddings for the simulated object that can be used to search media content 402 for the corresponding object.

In some cases, a matching object as indicated in user query 404 can be received from a generative machine learning model. For example, search and recognition system 410 can use an applicable artificial intelligence (AI) based technique (e.g., artificial neural network) to generate a predicted representation of an object in a particular scene. For example, if user query 404 includes a request to search media content 402 for iguana tampering with a flower bed in a yard, search and recognition system 410 may generate, using a generative ML model, a predicted image or motion of an iguana tampering with a flower bed in the yard. Upon receiving feedback from user(s) 132 confirming the prediction, search and recognition system 410 may search media content 402 based on the predicted image or motion generated by a generative ML model.

In some instances, the generative ML model (e.g., generative AI) can generate a variety of images or pictures from the textual description and search within media content 402 to determine if anything that was near/close to the generated images was present. Depending on the processing power and memory of the system the user query 404 was generated on, the depth of the search would be appropriately constructed to operate efficiently on the system that was executing the system.

In step 540, method 500 includes determining whether the media content includes the matching object based on the one or more multimodal feature embeddings describing the at least one object. For example, search and recognition system 410 can determine whether media content 402 includes the matching object based on embeddings 414 describing the at least one object.

In step 550, method 500 includes returning one or more results in response to determining that the media content includes the matching object. For example, search and recognition system 410 may return output 420 (e.g., search results) in response to determining that media content 402 includes the matching object.

Figure 6:
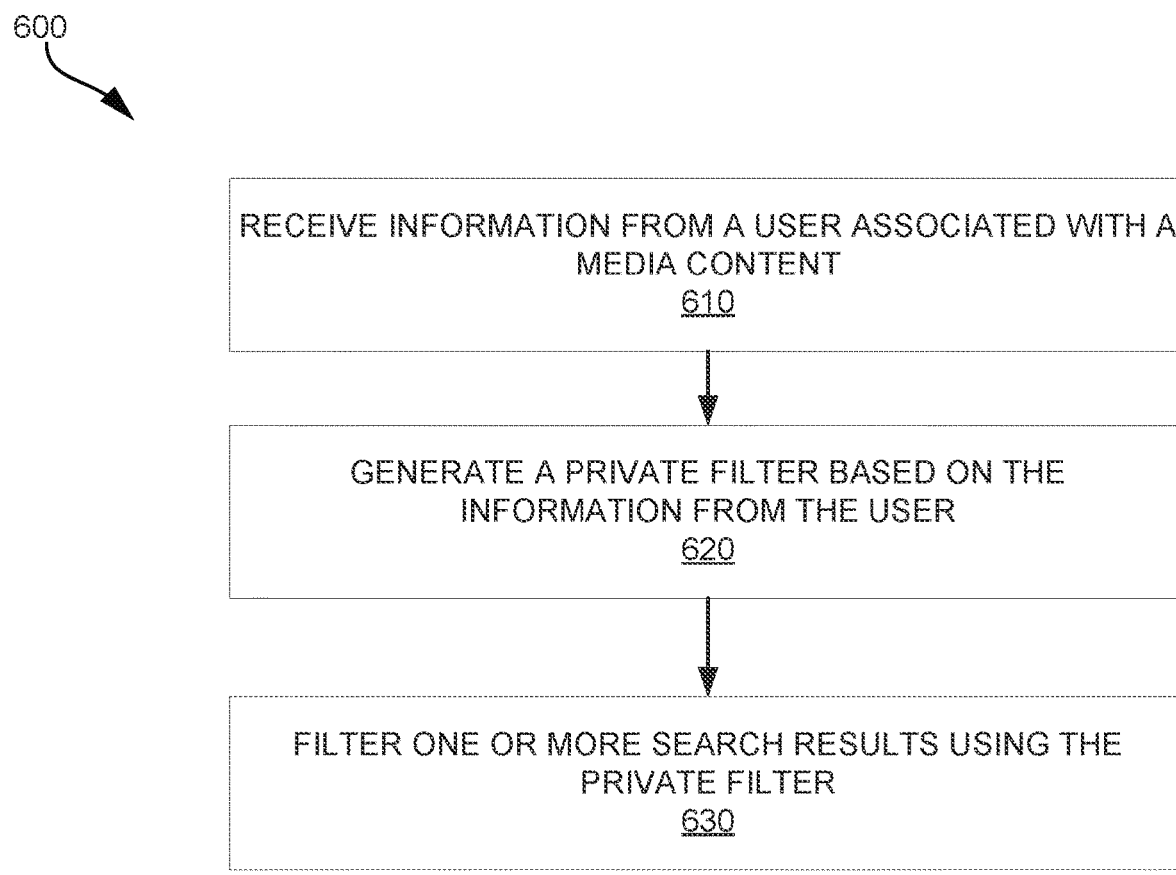
FIG. 6 illustrates a flowchart of an example method for generating a privacy filter to filter search results, according to some examples of the present disclosure.

FIG. 6 is a diagram illustrating a flowchart of an example method 600 for generating a privacy filter to filter search results, according to some examples of the present disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 4. However, method 600 is not limited to that example.

In step 610, method 600 includes receiving information from a user associated with a media content. For example, search and recognition system 410 may receive information from a user (e.g., user(s) 132) associated with media content 402. In some examples, the information from user(s) 132 may include certain features that user(s) 132 would like to be hidden from search results. For example, user query 404 may include a request to search media content 402 for any person (e.g., person 310) approaching the front door, but exclude a mailman.

In step 620, method 600 includes generating a private filter based on the information from the user. For example, search and recognition system 410 may generate a private filter based on the information from the user (e.g., a private filter that would filter out the appearance of a mailman).

In step 630, method 600 includes filtering one or more search results using the private filter. For example, search and recognition system 410 may filter output 420 to include any person (e.g., person 310) and exclude a mailman.

Figure 7:
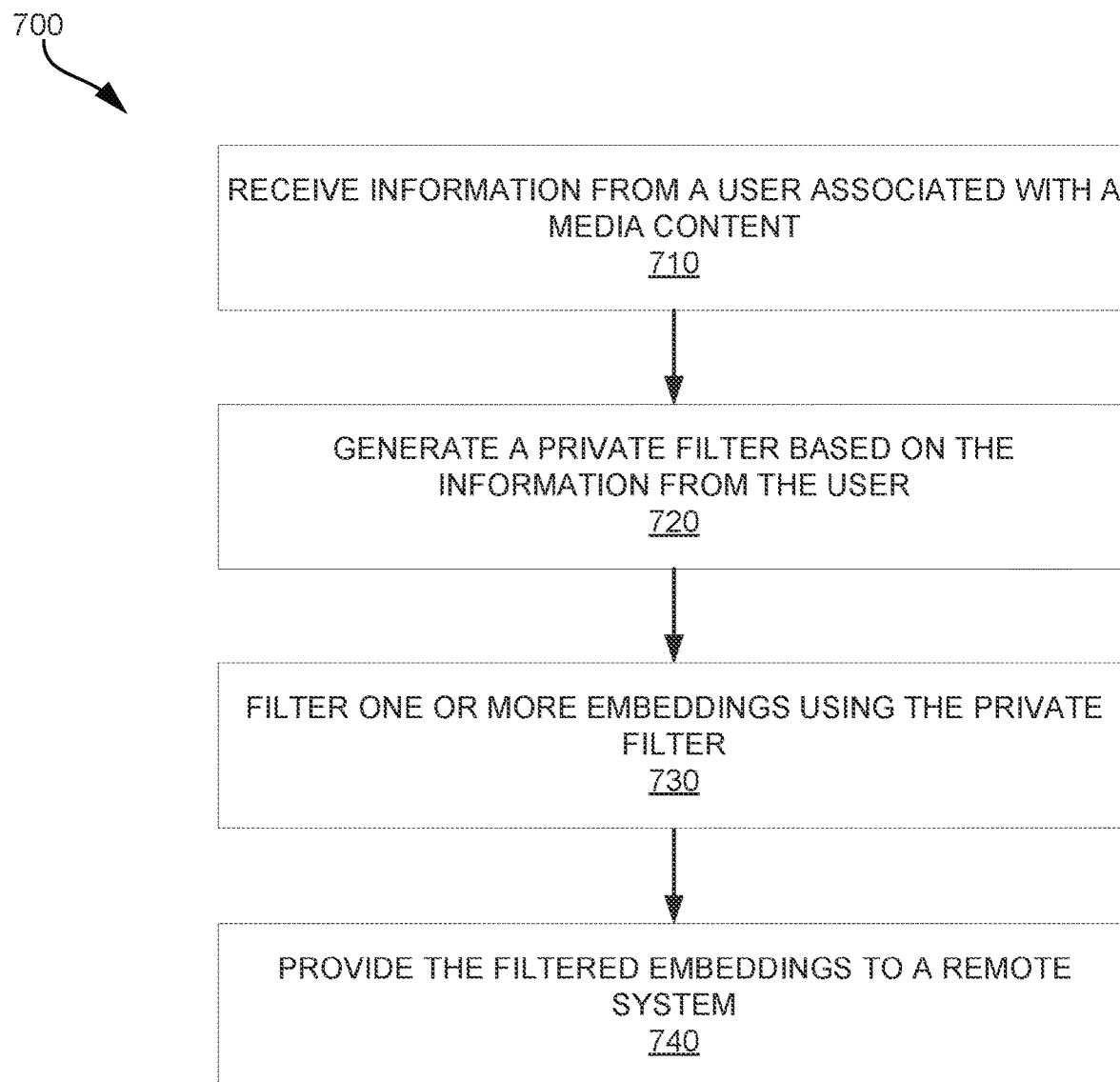
FIG. 7 illustrates a flowchart of an example method for generating a user-based privacy filter to filter multimodal feature embeddings, according to some examples of the present disclosure.

FIG. 7 is a diagram illustrating a flowchart of an example method 700 for generating a user-based privacy filter to filter multimodal feature embeddings, according to some examples of the present disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 4. However, method 700 is not limited to that example.

In step 710, method 700 includes receiving information from a user associated with a media content. For example, search and recognition system 410 may receive information from a user (e.g., user(s) 132) associated with media content 402. The user query 404 may include information of certain features that user(s) 132 would like to be hidden and not be searched within media content 402. For example, the information from the user may indicate that any features relevant to a child are not to be encoded into embedding space so that such features cannot be searched when searching for an object based on feature embeddings (e.g., method 500 as illustrated in FIG. 5) is performed.

In step 720, method 700 includes generating a private filter based on the information from the user. For example, search and recognition system 410 may generate a private filter based on the information from the user (e.g., a private filter that would not encode any feature relating to a child into embedding space).

In step 730, method 700 includes filtering one or more embeddings using the private filter. For example, search and recognition system 410 may filter one or more embeddings using the private filter. As follows, the one or more embeddings that are generated do not include any embeddings that are related to features of a child.

In step 740, method 700 includes providing the filtered embeddings to a remote system. For example, search and recognition system 410 may provide the filtered embeddings to a remote system (e.g., content server 120) such that feature embeddings that are used for searching a particular object do not include ones that are indicated by a user to be unwanted or unauthorized for privacy preservation.

Figure 8:
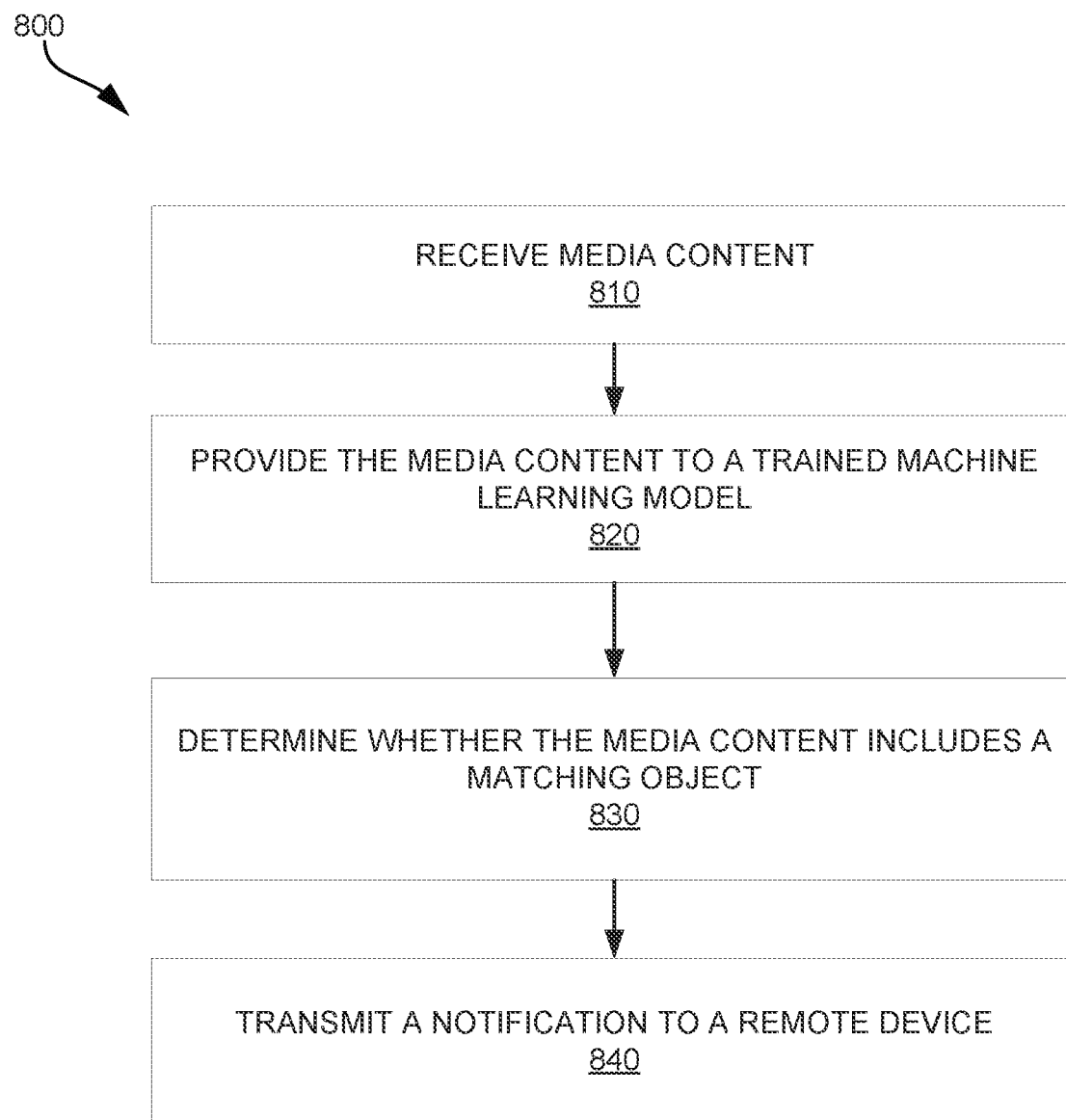
FIG. 8 illustrates a flowchart of an example method for device-to-device communication based on object detection, according to some examples of the present disclosure.

FIG. 8 is a diagram illustrating a flowchart of an example method 800 for device-to-device communication based on object detection/recognition, according to some examples of the present disclosure. The technology described herein with respect to generating search results can be performed on media content (e.g., video frames or multimedia) that is captured in real time, for example, by a surveillance and security camera (e.g., security camera 304). As follows, upon determining that the media content includes a matching object as indicated in a user query, a notification or an alert can be transmitted to a remote device as illustrated below with respect to method 800.

Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIG. 4. However, method 800 is not limited to that example.

In step 810, method 800 includes receiving media content. For example, search and recognition system 410 may receive media content 402 that comprises a plurality of video frames. The media content can include a recording or live-feed video captured from a security system (e.g., surveillance and security camera, security camera 304, etc.) that may depict, describe, identify, and/or be related to an object, an event, a sound, and so on.

In step 820, method 800 includes providing the media content to a trained machine learning model. For example, the media content received at step 810 can be fed to ML model 412 of search and recognition system 410 as illustrated in FIG. 4.

In step 830, method 800 includes determining whether the media content includes a matching object. For example, search and recognition system 410 can determine, based on output 420 of ML model 412, whether media content 402 includes a matching object as requested in user query 404.

In step 840, method 800 includes transmitting a notification to a remote device. For example, in response to determining that media content 402 includes a matching object, search and recognition system 410 can transmit a notification or an alert to a remote device such as a user device.

Figure 9:
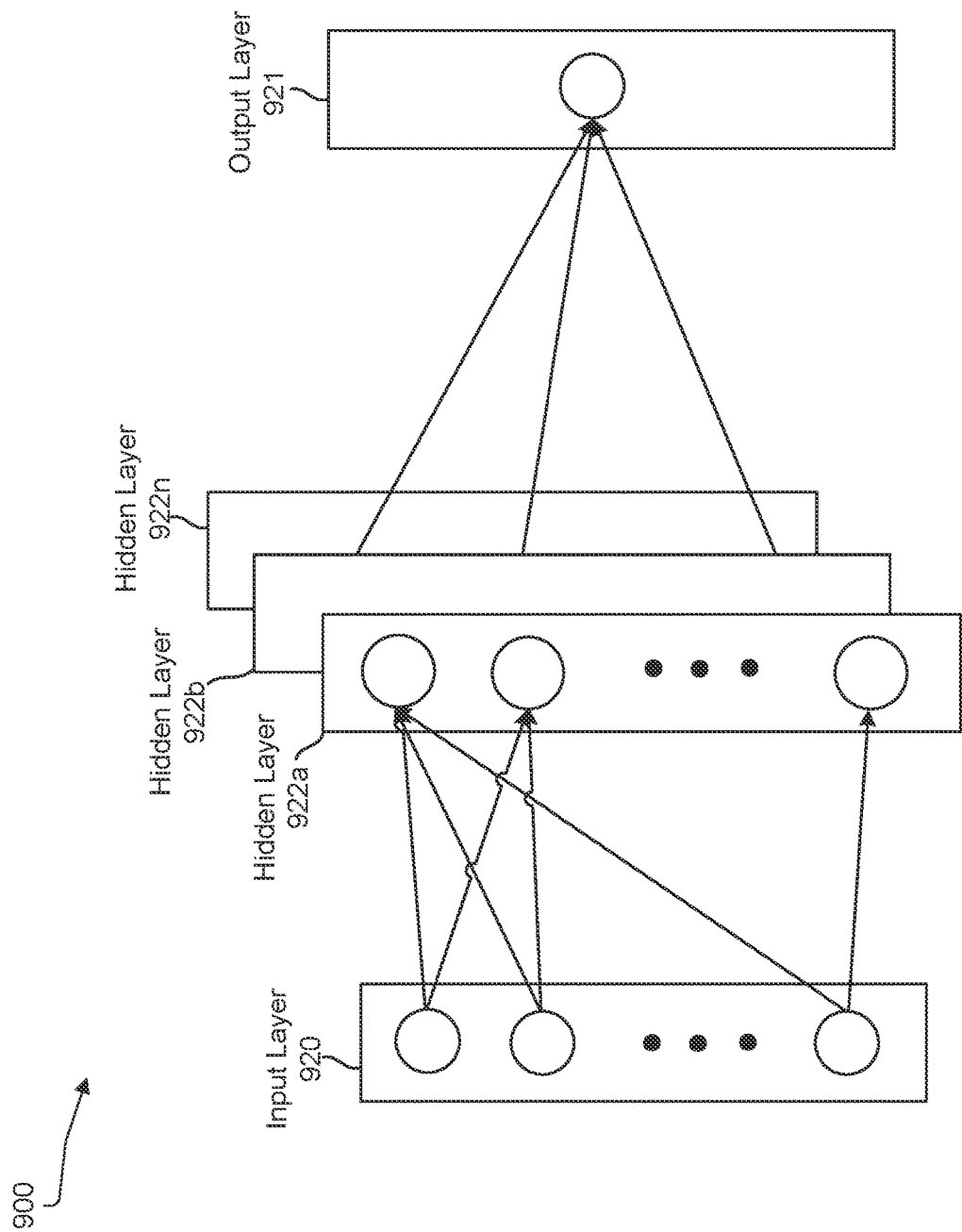
FIG. 9 is a diagram illustrating an example of a neural network architecture, according to some examples of the present disclosure.

FIG. 9 is a diagram illustrating an example of a neural network architecture 900 that can be used to implement some or all of the neural networks described herein (e.g., ML model 412). The neural network architecture 900 can include an input layer 920 can be configured to receive and process data to generate one or more outputs. The neural network architecture 900 also includes hidden layers 922*a*, 922*b*, through 922*n*. The hidden layers 922*a*, 922*b*, through 922*n* include "n" number of hidden layers, where "n" is an integer greater than or equal to one. The number of hidden layers can be made to include as many layers as needed for the given application. The neural network architecture 900 further includes an output layer 921 that provides an output resulting from the processing performed by the hidden layers 922*a*, 922*b*, through 922*n*.

The neural network architecture 900 is a multi-layer neural network of interconnected nodes. Each node can represent a piece of information. Information associated with the nodes is shared among the different layers and each layer retains information as information is processed. In some cases, the neural network architecture 900 can include a feed-forward network, in which case there are no feedback connections where outputs of the network are fed back into itself. In some cases, the neural network architecture 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922*a*. For example, as shown, each of the input nodes of the input layer 920 is connected to each of the nodes of the first hidden layer 922*a*. The nodes of the first hidden layer 922*a* can transform the information of each input node by applying activation functions to the input node information. The information derived from the transformation can then be passed to and can activate the nodes of the next hidden layer 922*b*, which can perform their own designated functions. Example functions include convolutional, up-sampling, data transformation, and/or any other suitable functions. The output of the hidden layer 922*b* can then activate nodes of the next hidden layer, and so on. The output of the last hidden layer 922*n* can activate one or more nodes of the output layer 921, at which an output is provided. In some cases, while nodes in the neural network architecture 900 are shown as having multiple output lines, a node can have a single output and all lines shown as being output from a node represent the same output value.

In some cases, each node or interconnection between nodes can have a weight that is a set of parameters derived from the training of the neural network architecture 900. Once the neural network architecture 900 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network architecture 900 to be adaptive to inputs and able to learn as more and more data is processed.

The neural network architecture 900 is pre-trained to process the features from the data in the input layer 920 using the different hidden layers 922*a*, 922*b*, through 922*n* in order to provide the output through the output layer 921.

In some cases, the neural network architecture 900 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network architecture 900 is trained well enough so that the weights of the layers are accurately tuned.

To perform training, a loss function can be used to analyze an error in the output. Any suitable loss function definition can be used, such as a Cross-Entropy loss. Another example of a loss function includes the mean squared error (MSE), defined as $E\_total=\Sigma(½ \text{ (target−output)}^2)$. The loss can be set to be equal to the value of $E\_total$.

The loss (or error) will be high for the initial training data since the actual values will be much different than the predicted output. The goal of training is to minimize the amount of loss so that the predicted output is the same as the training output. The neural network architecture 900 can perform a backward pass by determining which inputs (weights) most contributed to the loss of the network, and can adjust the weights so that the loss decreases and is eventually minimized.

The neural network architecture 900 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network architecture 900 can include any other deep network other than a CNN, such as an autoencoder, Deep Belief Nets (DBNs), Recurrent Neural Networks (RNNs), among others.

As understood by those of skill in the art, machine-learning based techniques can vary depending on the desired implementation. For example, machine-learning schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Computer System

Figure 10:
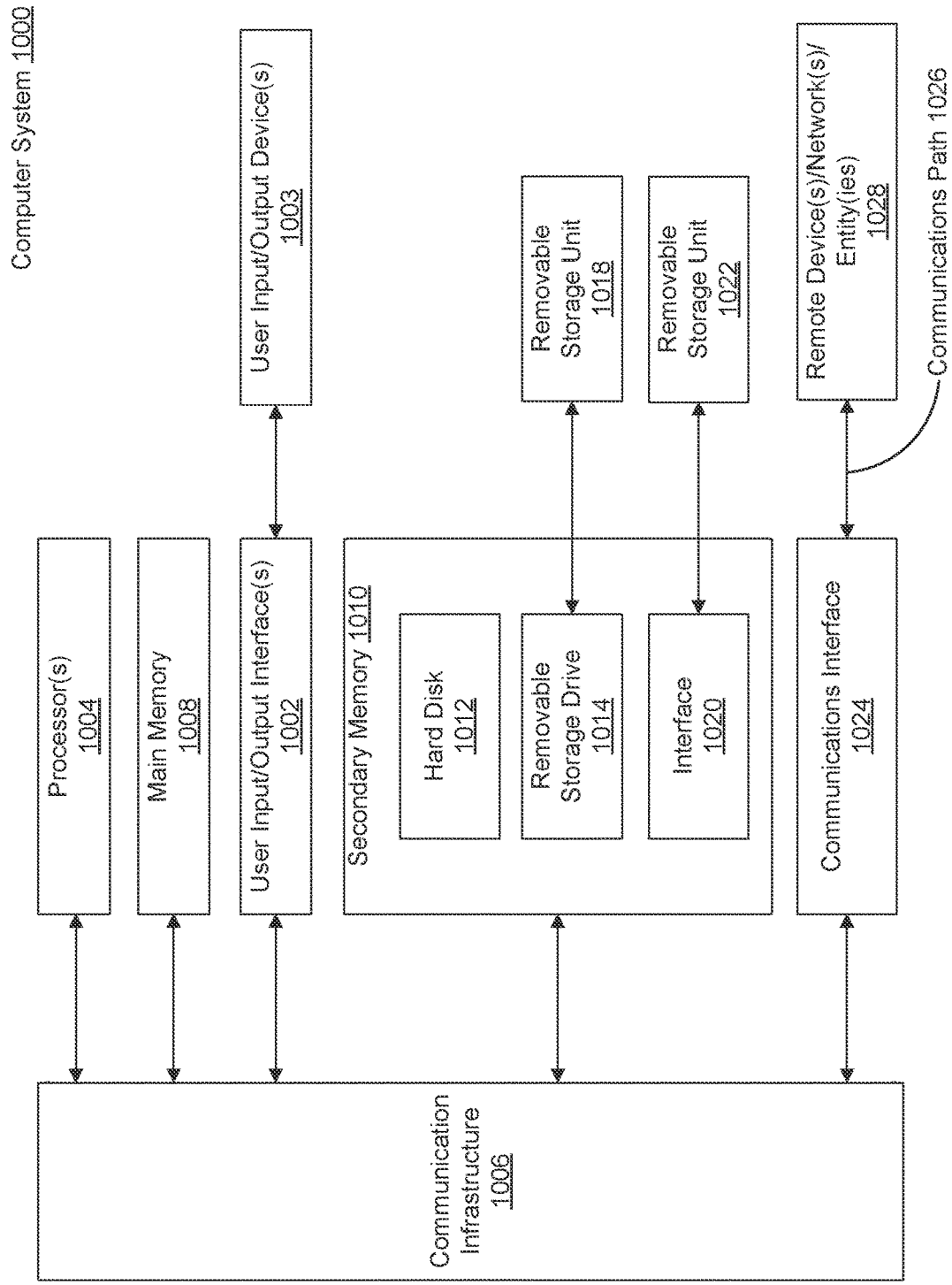
FIG. 10 illustrates an example computer system that can be used for implementing various aspects of the present disclosure.

Various aspects and examples may be implemented, for example, using one or more well-known computer systems, such as computer system 1000 shown in FIG. 10. For example, the media device 106 may be implemented using combinations or sub-combinations of computer system 1000. Also or alternatively, one or more computer systems 1000 may be used, for example, to implement any of the aspects and examples discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system xx00 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communications path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system, comprising: one or more memories; and at least one processor coupled to at least one of the one or more memories and configured to perform operations comprising: receiving media content, the media content comprising a plurality of video frames; generating, using a pre-output layer of a machine learning algorithm, one or more multimodal feature embeddings describing at least one object for the plurality of video frames; receiving a query including a request to search the media content for a matching object; determining whether the media content includes the matching object based on the one or more multimodal feature embeddings describing the at least one object; and returning one or more results in response to determining that the media content includes the matching object.

Aspect 2. The system of Aspect 1, wherein the at least one processor is configured to perform operations comprising: filtering the one or more results based on a user-generated privacy filter.

Aspect 3. The system of any of Aspects 1 to 2, wherein the at least one processor is configured to perform operations comprising: transmitting a notification to a remote device.

Aspect 4. The system of any of Aspects 1 to 3, wherein the matching object in the request is a simulated object.

Aspect 5. The system of any of Aspects 1 to 4, wherein the matching object in the request is received from a generative machine learning model.

Aspect 6. The system of any of Aspects 1 to 5, wherein the query includes a request to search the media content for a motion associated with the matching object.

Aspect 7. The system of any of Aspects 1 to 6, wherein the query includes a request to search the media content for sound associated with the matching object.

Aspect 8. The system of any of Aspects 1 to 7, wherein the media content comprises vectorized data.

Aspect 9. The system of any of Aspects 1 to 8, wherein the at least one processor is configured to perform operations comprising: transmitting the one or more multimodal feature embeddings to a remote system.

Aspect 10. The system of any of Aspects 1 to 9, wherein the one or more multimodal feature embeddings are generated based on at least one of image data, audio data, motion data, or text data of the media content.

Aspect 11. A computer-implemented method for processing media content, the computer-implemented method comprising: receiving media content, the media content comprising a plurality of video frames; generating, using a pre-output layer of a machine learning algorithm, one or more multimodal feature embeddings describing at least one object for the plurality of video frames; receiving a query including a request to search the media content for a matching object; determining whether the media content includes the matching object based on the one or more multimodal feature embeddings describing the at least one object; and returning one or more results in response to determining that the media content includes the matching object.

Aspect 12. The computer-implemented method of Aspect 11, further comprising: filtering the one or more results based on a user-generated privacy filter.

Aspect 13. The computer-implemented method of any of Aspects 11 to 12, further comprising: transmitting a notification to a remote device.

Aspect 14. The computer-implemented method of any of Aspects 11 to 13, wherein the matching object in the request is a simulated object.

Aspect 15. The computer-implemented method of any of Aspects 11 to 14, wherein the matching object in the request is received from a generative machine learning model.

Aspect 16. The computer-implemented method of any of Aspects 11 to 15, wherein the query includes a request to search the media content for a motion associated with the matching object.

Aspect 17. The computer-implemented method of any of Aspects 11 to 16, wherein the query includes a request to search the media content for sound associated with the matching object.

Aspect 18. The computer-implemented method of any of Aspects 11 to 17, wherein the media content comprises vectorized data.

Aspect 19. The computer-implemented method of any of Aspects 11 to 18, further comprising: transmitting the one or more multimodal feature embeddings to a remote system.

Aspect 20. The computer-implemented method of any of Aspects 11 to 19, wherein the one or more multimodal feature embeddings are generated based on at least one of image data, audio data, motion data, or text data of the media content.

Aspect 21. A non-transitory computer-readable medium having instructions stored thereon that, when executed by at least one computing device, cause the at least one computing device to perform a method according to any of Aspects 11 to 20.

Aspect 22. A system comprising means for performing a method according to any of Aspects 11 to 20.

What is claimed is:

1. A system comprising:
   one or more memories; and
   at least one processor coupled to at least one of the one or more memories and configured to perform operations comprising:
      generating, by a pre-output layer of a machine learning algorithm, one or more feature embeddings describing a first object depicted in at least one video frame of a media content comprising a plurality of video frames;
      receiving a query including a request to search the media content for a second object matching the first object;
      in response to the query, searching a set of feature embeddings associated with the media content for the one or more feature embeddings describing the first object;
      based on a search result obtained from searching the set of feature embeddings associated with the media content for the one or more feature embeddings describing the first object, determining whether at least a portion of the media content depicts the second object; and
      generating one or more query results in response to determining that at least a portion of the media content depicts the second object.

2. The system of claim 1, wherein the at least one processor is configured to perform operations comprising:
   determining whether to filter at least one query result from one or more query results based on a privacy filter, the privacy filter comprising at least one feature embedding generated based on a user input identifying one or more items to exclude from query results, the at least one feature embedding describing the one or more items identified in the user input; and
   filtering the at least one query result from the one or more query results based on the privacy filter comprising the at least one feature embedding.

3. The system of claim 1, wherein the at least one processor is configured to perform operations comprising:
   tagging portions of the media content with respective feature embeddings from the set of feature embeddings; and searching the portions of the media content for the second object based on tags generated by the tagging of the portions of the media content with the respective feature embeddings.

4. The system of claim 1, wherein the second object comprises a simulated object generated based on an object description.

5. The system of claim 1, wherein the media content comprises a live video feed or recording, and wherein determining whether at least a portion of the media content depicts the second object comprises determining whether at least a portion of the live video feed or recording depicts the second object.

6. The system of claim 1, wherein the request to search the media content for the second object comprises a request to search the media content for motion associated with the second object, and wherein the one or more feature embeddings encode information about the motion associated with the second object.

7. The system of claim 1, wherein the request to search the media content for the second object comprises a request to search an audio portion of the media content for sound associated with the second object, and wherein the one or more feature embeddings encode information about the sound associated with the second object.

8. The system of claim 1, wherein the media content comprises the set of feature embeddings.

9. The system of claim 1, wherein searching a set of feature embeddings associated with the media content for the one or more feature embeddings describing the first object and determining whether at least a portion of the media content depicts the second object are performed without using or relying on semantic labels.

10. The system of claim 1, wherein the one or more feature embeddings comprises one or more multimodal feature embeddings generated based on two or more signals, the two or more signals comprising at least one of a visual signal, an audio signal, a text signal, and a motion signal, and wherein the one or more multimodal feature embeddings encode information about the first object from the two or more signals.

11. A computer-implemented method for processing media content, the computer-implemented method comprising:
generating, by a pre-output layer of a machine learning algorithm, one or more feature embeddings describing a first object depicted in at least one video frame of a media content comprising a plurality of video frames;
receiving a query including a request to search the media content for a second object matching the first object;
in response to the query, searching a set of feature embeddings associated with the media content for the one or more feature embeddings describing the first object;
based on a search result obtained from searching the set of feature embeddings associated with the media content for the one or more feature embeddings describing the first object, determining whether at least a portion of the media content depicts the second object; and
generating one or more query results in response to determining that at least a portion of the media content depicts the second object.

12. The computer-implemented method of claim 11, further comprising:
determining whether to filter at least one query result from one or more query results based on a privacy filter, the privacy filter comprising at least one feature embedding generated based on a user input identifying one or more items to exclude from query results, the at least one feature embedding describing the one or more items identified in the user input; and
filtering the at least one query result from the one or more query results based on the privacy filter comprising the at least one feature embedding.

13. The computer-implemented method of claim 11, wherein searching a set of feature embeddings associated with the media content for the one or more feature embeddings describing the first object and determining whether at least a portion of the media content depicts the second object are performed without using or relying on semantic labels.

14. The computer-implemented method of claim 11, wherein the second object comprises a simulated object generated based on an object description.

15. The computer-implemented method of claim 11, wherein the media content comprises a live video feed or recording, and wherein determining whether at least a portion of the media content depicts the second object comprises determining whether at least a portion of the live video feed or recording depicts the second object.

16. The computer-implemented method of claim 11, wherein the request to search the media content for the second object comprises a request to search the media content for motion associated with the second object, and wherein the one or more feature embeddings encode information about the motion associated with the second object.

17. The computer-implemented method of claim 11, wherein the request to search the media content for the second object comprises a request to search an audio portion of the media content for sound associated with the second object, and wherein the one or more feature embeddings encode information about the sound associated with the second object.

18. The computer-implemented method of claim 11, wherein the media content comprises the set of feature embeddings.

19. The computer-implemented method of claim 11, wherein the one or more feature embeddings comprises one or more multimodal feature embeddings generated based on two or more signals, the two or more signals comprising at least one of a visual signal, an audio signal, a text signal, and a motion signal, and wherein the one or more multimodal feature embeddings encode information about the first object from the two or more signals.

20. A non-transitory computer-readable medium having instructions stored thereon that, when executed by at least one computing device, cause the at least one computing device to perform operations comprising:
generating, by a pre-output layer of a machine learning algorithm comprising a layer prior to an output layer of the machine learning algorithm, one or more feature embeddings describing a first object depicted in at least one video frame of a media content comprising a plurality of video frames;
receiving a query including a request to search the media content for a second object matching the first object;
in response to the query, searching a set of feature embeddings associated with the media content for the one or more feature embeddings describing the first object;
based on a search result obtained from searching the set of feature embeddings associated with the media content for the one or more feature embeddings describing the first object, determining whether at least a portion of the media content depicts the second object; and generating one or more query results in response to determining that at least a portion of the media content depicts the second object.

* * * * *